Figure 2:
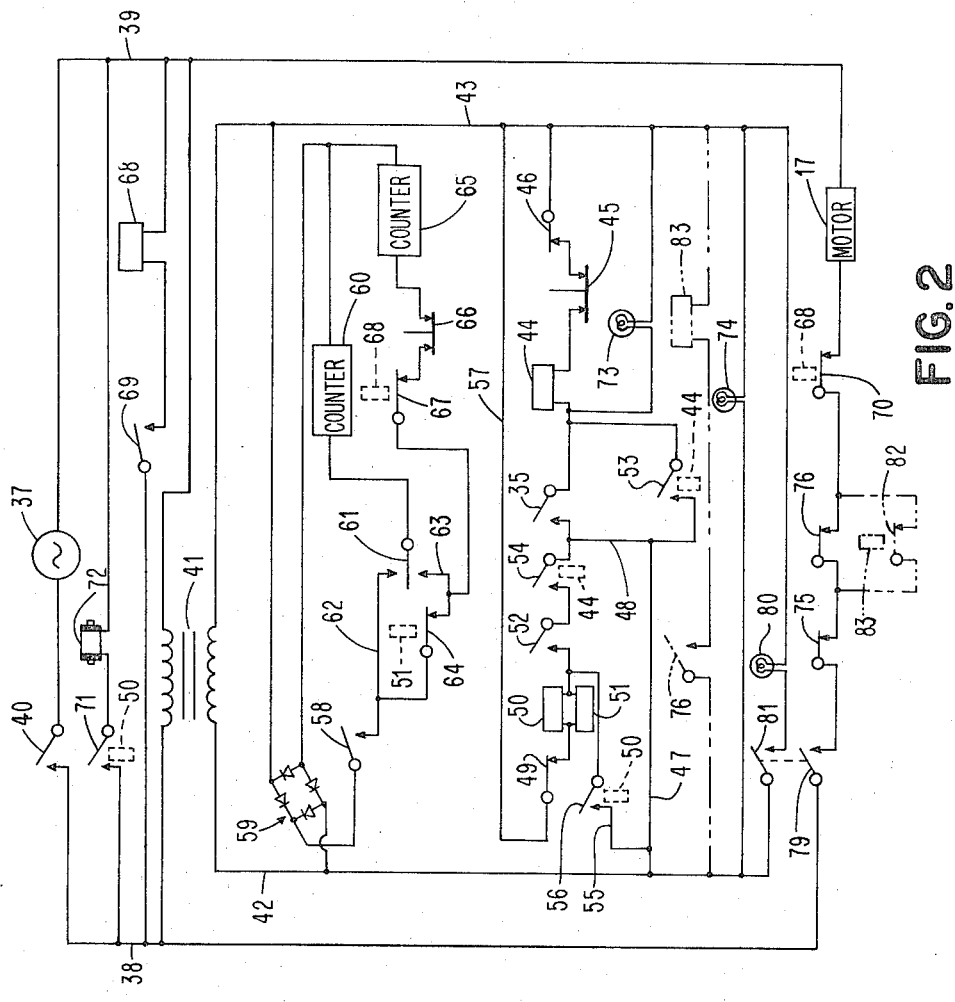

United States Patent [19]
Schmidt

[11] 3,872,751
[45] Mar. 25, 1975

[54] COUNTING MEANS FOR MATERIAL CUTTING APPARATUS

[76] Inventor: Volker Schmidt, R.R. No. 7, Todds Rd., Lexington, Ky. 40502

[22] Filed: May 15, 1973

[21] Appl. No.: 360,411

[52] U.S. Cl. ............................. 83/69, 83/80, 83/106
[51] Int. Cl. ............................................. B26d 7/28
[58] Field of Search .......... 83/69, 80, 104, 106, 522

[56] References Cited
UNITED STATES PATENTS

| | | | |
|---|---|---|---|
| 2,732,896 | 1/1956 | Lundahl | 83/80 X |
| 3,411,388 | 11/1968 | Rappaport | 83/76 |
| 3,550,493 | 12/1970 | Benbenek | 83/522 X |
| 3,672,249 | 6/1972 | Sasaki | 83/80 |
| 3,701,300 | 10/1972 | Schmidt et al. | 83/522 X |
| 3,741,054 | 6/1973 | Alperin | 83/80 |
| 3,760,669 | 9/1973 | Rosenthal | 83/522 |

*Primary Examiner*—J. M. Meister
*Attorney, Agent, or Firm*—Frank C. Leach, Jr.

[57] ABSTRACT

A first counter means each cycle in which a segment of a strip of material to be cut is within a predetermined thickness range and stops the cutting apparatus after a selected number of cycles has occurred. A second counter is employed to count either all of the cycles of operation of the apparatus or only the cycles in which the segment being cut is within the predetermined thickness range.

13 Claims, 2 Drawing Figures

COUNTING MEANS FOR MATERIAL CUTTING APPARATUS

In U.S. Pat. No. 3,701,300 to Volker Schmidt et al, there is shown a material cutting apparatus for cutting segments of a strip of material. The thickness of each segment of material to be cut is measured during the feed portion of the previous cycle to that in which the segment is cut. If the thickness of the segment is within a predetermined thickness range, a selector diverts the cut segment to one collector area while the selector diverts the cut segment to a different collector area if the segment is not within the predetermined thickness range.

Since the apparatus of the aforesaid patent has particular utility in cutting segments of material of a length to form belt loops and the operator works at a piece rate basis in some instances, it is desirable for the operator and the operator's supervisor to know the number of segments which have been cut from a strip of material. Depending on the type of operation, it may be desirable to know either the total number of segments that have been cut or only those segments that are satisfactory.

The present invention satisfactorily solves this problem by providing a counter which may be selectively employed to count all the cut segments of the strip of material or only those cut segments falling within the predetermined thickness range. It is only necessary to utilize a manual switch to determine the mode in which the counter will operate.

In some instances, it is desired to cut a predetermined number of segments within a predetermined thickness range. When this number of satisfctory segments has been cut from the strip of material, it is not necessary for any more segments to be cut from the strip of material. For example, the number of pants with which the belt loops would be employed would be known and the total number of required belt loops would be known for this number of pants. Therefore, when the number of satisfactory segments, which are required for use as belt loops with the known number of pants, has been cut, it is not necessary to cut more segments even though a length of the strip of material may still be available for further cutting.

The present invention satisfactorily solves this problem by utilizing a counter to count each cycle that a segment, which is cut from the strip of material, is within the predetermined thickness range. When the selected number of cycles has been counted, the counter is capable of producing a signal, which is employed in the present invention to automatically stop operation of the cutting apparatus of the aforesaid patent. Thus, the system of the present invention insures that only a selected number of satisfactory segments is cut.

When using the counter to automatically stop operation after a selected number of satisfactory segments has been cut from the strip of material in conjunction with a second counter, which is capable of counting either the total number of segments cut from the strip of material or only the satisfactory segments cut from the strip of material, one can determine how many waste segments are produced. This may enable the strips, which are sewn to each other to form the strip of material, to be arranged so as to reduce the number of unsatisfactory cut segments. Furthermore, it may enable a reduction in the length of the strip of material to be fed to the apparatus to produce a predetermined number of satisfactory cut segments.

An object of this invention is to provide an arrangement for stopping a cutting apparatus after a predetermined number of satisfactory segments of a strip of material have been cut.

Another object of this invention is to provide an arrangement for selectively counting either the total number of segments cut from a strip of material or the number of satisfactory segments cut from the strip of material.

Other objects will be readily perceived from the following description, claims, and drawing.

This invention relates to an apparatus for cutting a strip of material into segments of a selected length including means to feed the strip of material in a vertical direction past a cutting position and means to cut the fed material at the cutting position after stopping of the feed of the strip of material by the feed means with the cutting means being disposed beneath the feed means. Means supplies a signal once during each cycle with counting means to count each time that the signal is received from the signal supplying means. Means connects the signal supplying means to the counting means to supply the signal to the counting means from the signal supplying means at least during each cycle in which the thickness of the segment of the strip of material to be cut is within a predetermined thickness range.

Figure 1:
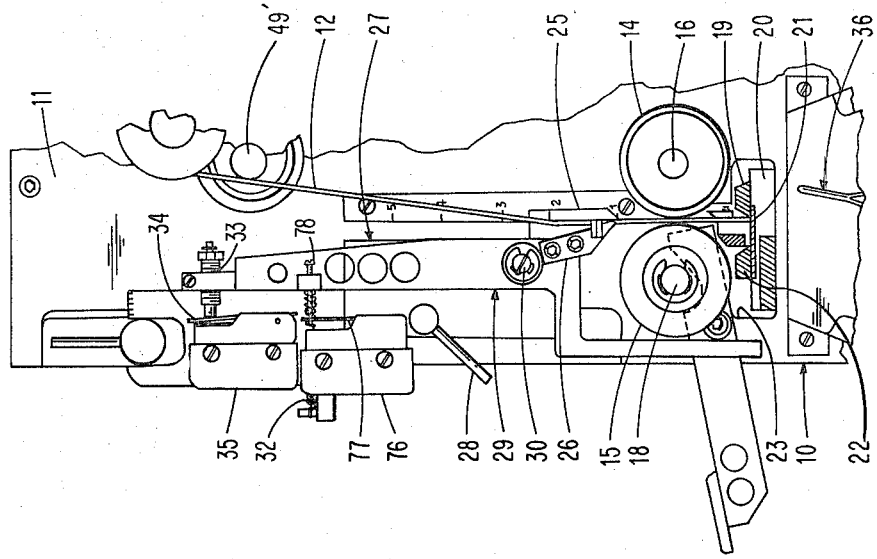

The attached drawing illustrates a preferred embodiment of the invention, in which:

FIG. 1 is a fragmentary front elevational view, partly in section, of a portion of the cutting apparatus with which the counting means of the present invention is employed; and FIG. 2 is a schematic diagram of an electrical circuit with which the counting means of the present invention is employed.

Referring to the drawing and particularly FIG. 1, there is shown the cutting apparatus of the aforesaid patent with which the counting means of the present invention is employed. The cutting apparatus includes a frame 10, which is supported on a stand (not shown) as shown and described in the aforesaid patent. The frame 10 has a base (not shown), which is supported by the stand, and a pair of upstanding supports (one shown at 11), which are spaced from each other and substantially parallel to each other.

As more particularly shown and described in the aforesaid patent, a strip 12 of material is fed by a knurled roller 14, which is preferably formed of metal, cooperating with a roller 15, which is preferably formed of plastic such as nylon, for example. The strip 12 of material is formed through having strips of lays or pieces of material sewed to each other by overlapping the adjacent ends of two strips and sewing them to each other as described in the aforesaid patent.

The roller 14 is driven by rotation of a shaft 16, which has the roller 14 mounted thereon for rotation. The shaft 16, which is rotatably supported in the support 11 and the support (not shown) in the manner more particularly shown and described in the aforesaid patent, is driven in only one direction from a motor 17 (see FIG. 2) in the manner more particularly shown and described in the aforesaid patent. The roller 15 is rotatably mounted on a stud 18 in the manner more particularly shown and described in the aforesaid patent.

After the strip 12 of material is fed past the rollers 14 and 15, feeding is stopped in the manner more particularly shown and described in the aforesaid patent. Then, the material is cut by cutting means, which includes a knife or cutting blade 19 on a plate 20 and a movable knife or cutting blade 21 cooperating with the cutting blade 19. The cutting blade 21 is fixed to an arm 22, which is pivotally mounted on the plate 20 and extends through an opening 23 in the support 11. This relationship is more particularly shown and described in the aforesaid patent.

Prior to passing between the rollers 14 and 15, the strip 12 of material passes downwardly between a meter plate 25 and a meter finger 26. The meter plate 25 is secured to a meter base block 27, which is slidably mounted on the support 11. The meter base block 27 is retained in any position to which it is moved by a clamp lever 28 in the manner more particularly shown and described in the aforesaid patent.

The meter finger 26 is fixed to a meter arm 29, which is pivotally mounted on a pivot pin 30 fixed to the meter base block 27. As more particularly shown and described in the aforesaid patent, the meter finger 26 is arranged with pins and a concave central longitudinal portion to aid in centering the strip 12 of material as the strip 12 of material is fed between the meter plate 25 and the meter finger 26.

Since the meter arm 29 and the meter plate 25 are both carried by the meter base block 27, any upward or downward sliding movement of the meter base block 27 moves both the meter plate 25 and the meter finger 26 vertically relatively to the rollers 14 and 15. The position of the meter plate 25 and the meter finger 26 relative to the rollers 14 and 15 is determined in accordance with the length of the strip 12 of material that is to be cut during each cycle.

A spring 32, which has one end secured to the meter arm 29 and its other end connected to the meter base block 27, continuously urges the meter arm 29 counterclockwise about the axis of the pivot pin 30. Thus, when a strip 12 of material is not fed between the meter plate 25 and the meter finger 26, the meter finger 26 is urged into engagement with the meter plate 25 by the spring 32.

Accordingly, when the strip 12 of material passes between the meter plate 25 and the meter finger 26, the meter arm 29 pivots clockwise about the axis of the pivot pin 30 to accommodate the strip 12 of material. As the thickness of the strip 12 of material increases, a greater clockwise pivoting of the meter arm 29 occurs.

When the thickness of the strip 12 of material exceeds the predetermined thickness, an adjustment screw 33 on the upper end of the meter arm 29 is moved away from the position in which it engages a resiliently biased arm 34 of a microswitch 35 due to the greater clockwise pivoting of the meter arm 29. When the resiliently biased arm 34 is allowed to move sufficiently because of the movement of the adjustment screw 33 due to the thickened portion of the strip 12 of material passing between the meter plate 25 and the meter finger 26, the microswitch 35 closes.

The closing of the microswitch 35 produces a signal, which is stored by the electric circuit of the aforesaid patent until after the cutting portion of the cycle and then used to change the position of a pivotally mounted selector 36, to indicate that the thickness of the measured portion of the strip 12 of material exceeds the predetermined thickness. This is because measuring of the strip 12 of material by cooperation of the meter plate 25 and the meter finger 26 occurs during the feed portion of the prior cycle of operation to that in which cutting of the measured portion of the strip 12 of material occurs. It should be understood that the selector 36 determines to which collector area the cut segment is directed as more particularly shown and described in the aforesaid patent.

As shown in FIG. 2, the electrical circuit includes an AC power source 37, which is connected to supply lines 38 and 39 through a switch 40. When the switch 40 is closed, a transformer 41 supplies a stepped down AC voltage to lines 42 and 43.

Accordingly, when the switch 40 is closed, AC voltage is available between the lines 42 and 43. Thus, when the switch 35 is closed due to the measured portion of the strip 12 of material being thicker than the predetermined thickness, a relay 44 is picked if a push button 45, which is normally closed, is closed. Normally closed breaker contacts 46, which are supported by the support 11 in the manner more particularly shown and described in the aforesaid patent and closed during the feed portion of the cycle when measurement of the thickness of the strip 12 of material is occurring as more particularly shown and described in the aforesaid patent, also are closed. Accordingly, a circuit is completed from the line 42 through a line 47, a line 48, the closed switch 35, the relay 44, the closed push button 45, and the closed breaker contacts 46 to the line 43.

After completion of the feed and cutting portions of the cycle, normally closed breaker contacts 49, which are supported by the support 11 in the manner more particularly shown and described in the aforesaid patent, are opened by a first cam (not shown), which is fixed to a shaft 49' (see FIG. 1) for rotation therewith in the manner more particularly shown and described in the aforesaid patent. The shaft 49' is driven from the motor 17 in the manner more particularly shown and described in the aforesaid patent.

As shown and described in the aforesaid patent, the first cam, which opens the normally closed breaker contacts 49, has its profile designed to open the normally closed breaker contacts 49 just after completion of the cutting portion of the cycle. The opening of the breaker contacts 49 inactivates a relay 50, which is the relay that stores the signal from closing of the switch 35 if the measured thickness of the strip 12 of material exceeded the predetermined thickness, if the relay 50 was energized during the prior cycle of operation because of the thickness of the strip 12 of material exceeding the predetermined thickness. The opening of the breaker contacts 49 is for a very short period of time but this removes any stored signal from the previous cycle of operation.

A relay 51 is disposed in parallel with the relay 50 and is energized whenever the relay 50 is picked and deenergized whenever the relay 50 is inactivated by the opening of the breaker contacts 49. Thus, the relay 51 also is responsive to the signal from the relay 44 whenever the strip 12 of material exceeds the predetermined thickness.

Shortly after the breaker contacts 49 are opened by the first cam, the breaker contacts 49 again close due to the profile of the first cam. Just after the breaker contacts 49 close, normally open breaker contacts 52, which are supported by the support 11 in the manner more particularly shown and described in the aforesaid patent, are closed by a second cam (not shown) in the manner more particularly shown and described in the aforesaid patent. The second cam also is fixed to the shaft 49'. If the relay 44 was energized during the feed portion of the cycle when the thickness of the strip 12 of material was measured, then the relays 50 and 51 are energized when the breaker contacts 49 and 52 close.

When the relay 44 is picked by closing of the switch 35, a normally open contact 53 of the control relay 44 is closed. Since the normally open contact 53 is in parallel with the switch 35, the closing of the normally open contact 53 provides a hold circuit for the relay 44 to maintain the relay 44 energized as long as the push button 45 and the breaker contacts 46 remain closed. Therefore, only a very slight length of the portion of the strip 12 of material being fed need be greater than the predetermined thickness for the relay 44 to be activated and remain in that condition.

With the relay 44 energized and the breaker contacts 49 and 52 closed, the relays 50 and 51 are activated because normally open contact 54 of the relay 44 also is closed when the relay 44 is picked. Accordingly, a signal, which closing of the switch 35 produced to indicate that the thickness of the strip 12 of material exceeds the predetermined thickness, is transferred from the relay 44 and is now stored by the relays 50 and 51 being energized.

Energization of the relay 50 provides a hold circuit for the relays 50 and 51 from the line 42 through the line 47, a line 55, a normally open contact 56 of the relay 50, the relays 50 and 51, the normally closed breaker contacts 49, and a line 57 to the line 43. As the motor 17 continues to rotate the shaft 49' on which the cams are mounted as shown and described in the aforesaid patent, the normally open breaker contacts 52 are opened by the second cam so that the hold circuit through the normally open contact 56 of the relay 50 must be employed to keep the relays 50 and 51 energized.

Shortly after the breaker contacts 52 are opened, the normally closed breaker contacts 46 are opened by the first cam, which also cooperates with the breaker contacts 49 as previously mentioned. The opening of the breaker contacts 46 causes the relay 44 to be deenergized. The breaker contacts 46 close shortly after opening because of the profile of the first cam with which they cooperate. Thus, this enables the relay 44 to again be ready for activation if the switch 35 is closed because the thickness of the strip 12 of material exceeds the predetermined thickness during the feed portion of the next cycle since all of the foregoing activations by the cams of the breaker contacts 46, 49, and 52 occur after completion of the cutting portion of the cycle of operation and before the feed portion of the next cycle of operation.

The second cam, which cooperates with the normally open breaker contacts 52, also cooperates with normally open breaker contacts 58. The second cam causes closing of the breaker contacts 58 for only a short period of time to enable a signal to be transmitted from the line 42 through a full wave rectifier 59. The DC signal from the rectifier 59 is supplied to a counter 60 when a manual switch 61 engages a line 62. Thus, with the manual switch 61 engaging the line 62, the counter 60 receives a signal during every cycle of operation of the cutting apparatus. One suitable example of the counter 60 is sold by Veeder Root, Hartford, Conn. as model No. 744105–316.

If the manual switch 61 is engaging a line 63, the signal is supplied to the counter 60 only if a normally closed contact 64 of the relay 51 is closed. Thus, whenever the relay 51 is energized because of the thickness of the strip 12 of material exceeding the predetermined thickness, the normally closed contact 64 of the relay 51 is open and no signal is transmitted to the counter 60 when the breaker contacts 58 close. Accordingly, with the manual switch 61 engaging the line 63, the counter 60 counts only the cycles in which the thickness of the strip 12 of material to be cut does not exceed the predetermined thickness.

The normally open breaker contacts 58 are opened by the second cam during the feed portion of the next cycle after the normally open breaker contacts 52 have been closed and then opened by the second cam. Thus, this is approximately 90° later.

A counter 65 also is connected to the line 63 if a normally closed push button 66 is closed. The counter 65 is connected to the line 63 through the push button 66 when it is closed and through a normally closed contact 67 of an AC relay 68. Thus, when the push button 66 and the contact 67 are closed, the counter 65 receives a signal when the normally open breaker contacts 58 and the normally closed contact 64 of the relay 51 are closed.

The AC relay 68 is connected between the main supply lines 38 and 39 and is energized only when a microswitch 69 is closed. The microswitch 69 is closed only when the counter 65 has counted a predetermined number of cycles.

The counter 65 preferably has the microswitch 69 therein. One suitable example of the counter 65 is sold by Veeder Root, Hartford, Conn. as model No. 743895–216.

It should be understood that it is not necessary for the switch 69 to be within the counter 65 for satisfactory operation. Thus, if desired, the counter 65 could provide a signal to cause closing of the switch 69.

When the counter 65 is of the type sold as model No. 743895–216 by Veeder Root, the counter 65 is set to the number of cycles that it is desired to count. When the counter 65 has counted down to zero, the microswitch 69 is closed.

The closing of the switch 69 causes energization of the relay 68. As a result, the normally closed contact 67 of the relay 68 opens whereby the counter 65 is disconnected from the line 63.

When the relay 68 is picked, its normally closed contact 70 is opened so that the motor 17 is turned off. Thus, further cutting of the strip 12 of material stops upon the motor 17 ceasing to rotate. This may require one or two additional cycles of the motor 17 because of the momentum of the motor 17. If desired, a suitable brake or clutch could be employed to stop the motor 17 immediately.

The relay 50 has a normally open contact 71 connecting one side of a solenoid 72, which moves the selector 36 to the position in which the cut segment is diverted to the area in which the portions that are too thick are collected, to the line 38. The other side of the solenoid 72 is connected to the line 39. When the relay 50 is picked, the normally open contact 71 closes whereby the solenoid 72 is energized to pivot the selector 36 in the manner shown and described in the aforesaid patent to the position in which the selector 36 blocks the cut portion or segment of the strip 12 of material from falling into one of the passages and diverts it into the other. Energization of the solenoid 72 occurs after the cutting portion of the cycle in which the thickness of the strip 12 of material has been measured and before the feed portion of the next cycle during which the measured portion of the strip 12 of material would be cut.

Thus, the solenoid 72 is energized to change the position of the selector 36 after the cutting portion of the cycle and before the feed portion of the next cycle. Of course, the measurement of the thickness of the strip 12 of material during the feed portion of the cycle was not that portion of the strip 12 of material that is cut after the feed portion of the cycle but is that portion to be cut after the feed portion of the next cycle. Therefore, the selector 36 is properly positioned to be ready for the next cut segment of the strip 12 of material.

A lamp 73 is disposed in parallel with the relay 44 and is energized whenever the relay 44 is picked. Thus, the lamp 73 indicates whenever the thickness of the strip 12 of material has exceeded the predetermined thickness.

A lamp 74, which extends beteen the lines 42 and 43, is activated whenever the switch 40 is closed. Thus, the lamp 74 indicates whenever the power source 37 is connected to the supply lines 38 and 39.

In addition to the motor 17 being inactivated whenever the microswitch 69 is opened to cause the contact 70 of the relay 68 to open, the motor 17 also is inactivated whenever a switch 75 is opened due to the strip 12 of material being prevented from being fed in the manner shown and described in the aforesaid patent or whenever a microswitch 76, which is supported on the meter base block 27, is opened. As shown in FIG. 1, the microswitch 76 has a resiliently biased arm 77, which is engaged by an adjustment screw 78 supported on the meter arm 29 between the adjustment screw 33 and the pivot pin 30.

The adjustment screw 78 moves the arm 77 of the switch 76 inwardly to inactivate the motor 17 by opening the switch 76 only when there is no material beteen the meter plate 25 and the meter finger 26 whereby the arm 29 pivots counterclockwise. This insures that there is automatic shut off of the motor 17 whenever the strip 12 of the material ceases to be fed or the end of the strip 12 is not held so as to cause opening of the switch 75.

Furthermore, as shown in FIG. 2, a manual switch 79 also permits inactivation of the motor 17. A lamp 80 is connected between the lines 42 and 43 and is activated when the switch 79 is closed through having a switch 81 connected to the switch 79. Accordingly, the lamp 80 indicates when the motor switch 79 is closed even if the contact 70 of the relay 68 is opened or one of the switches 75 and 76 has been opened.

Even if the motor 17 becomes inactivated, the relays 50 and 51 remain energized because they are connected to the lines 42 and 43 of the secondary winding of the transformer 41. Therefore, the signal stored by energization of the relays 50 and 51 remains even if the operator opens the switch 79 to turn off the motor 17 when the operator leaves the apparatus of the present invention for a period of time. Of course, if the switch 40 is opened, the stored memory is lost.

As described in the aforesaid patent, the normally closed breaker contacts 46 and 49 are opened and closed and the normally open breaker contacts 52 are closed and opened during the final 90° of each revolution of the motor 17 for a particular cycle of operation. The second cam, which cooperates with the normally open breaker contacts 52, cooperates during the initial 90° of revolution (This is when feeding occurs.) of the next cycle of operation to close and open the normally open breaker contacts 58 so as to supply a signal to the counters 60 and 65.

If the strip 12 of material is formed by connecting the adjacent ends of two strips of the lays or pieces of the material to each other by spacing them from each other and utilizing threads to connect the adjacent spaced ends to each other, then the thin portions of the strip 12 of material would be the unsatisfactory portions. To enable the apparatus of the present invention to be utilized with this type of strip of material, it is only necessary to change the wiring in the microswitch 35 so that it closes when the arm 34 is moved toward the switch 35 by the adjustment screw 33 rather than when the arm 34 is allowed to move away from the switch 35. This would allow the switch 35 to close when the thickness of the strip 12 of material decreased below a predetermined thickness so as to indicate that the portion of the strip 12 of material passing between the meter plate 25 and the meter finger 26 was only the threads which connect the adjacent spaced ends of two strips of the lays or pieces of the material forming the strip 12 of material.

Because of the thinness of the strip 12 of material, the motor 17 would be inactivated through the switch 76 opening if the switch 76 were utilized in the same manner as previously described for the strip 12 of material when the strip 12 of material is formed by sewing overlapped portions of the strips from the lays or pieces of material to each other. Therefore, either the switch 76 must not be employed or the switch 76 must have its wiring changed so that it closes when the arm 77 is moved towards the switch 76 by the adjustment screw 78 and the switch 76 must be replaced in the portion of the circuit having the motor 17 by a normally closed contact 82 of a time relay 83 as shown in phantom in FIG. 2. The time relay 83 would be connected in series with the switch 76, which has been removed from the circuit having the motor 17, between the lines 41 and 42 as shown in phantom in FIG. 2. The time relay 83 is not activated to open the normally closed contact 82 and deenergize the motor 17 for a predetermined period of time sufficient to allow the portion of the strip 12 of material having threads to pass between the meter plate 25 and the meter finger 26.

It is necessary for the rollers 14 and 15 to feed the strip 12 of material when the strip 12 of material is very thin due to only the threads, which connect the adjacent spaced ends of two strips to each other, being disposed between the rollers 14 and 15. Accordingly, the rollers 14 and 15 must be capable of engaging each other rather than being slightly spaced therefrom. This engagement is obtained in the manner shown and described in the aforesaid patent. With the rollers 14 and 15 capable of engaging each other, they must be coated with a thin coating of a suitable protective material such as rubber, for example, to protect them when they engage.

The operation of the apparatus of the present invention when the strip 12 of material comprises strips from lays having their ends spaced from each other and connected by threads is the same as when the strip 12 of material comprises strips from lays having their ends overlapping and sewed to each other.

While the counter 60 has been shown and described as being selectively connected through the manual switch 61 to the line 62 or the line 63 so as to either count each cycle of operation or to count only the cycles in which the thickness of the strip 12 of material is within the predetermined thickness range, it should be understood that two separate counters could be employed rather than the counter 60 with one counter counting each cycle of operation and the other counter counting only the cycles in which the thickness of the strip 12 of material is within the predetermined thickness range. In this arrangement, the manual swtich 61 would be omitted, the one counter would be connected directly to the line 62, and the other counter connected directly to the line 63.

An advantage of this invention is that it enables a predetermined quantity of segments to be cut from a strip with each segment having a thickness within a predetermined thickness range. Another advantage of this invention is that it permits counting of the number of the cut segments that have a thickness within a predetermined range. A further advantage of this invention is that the total number of segments cut, irrespective of their thicknesses, can be counted.

For purposes of exemplification, a particular embodiment of the invention has been shown and described according to the best present understanding thereof. However, it will be apparent that changes and modifications in the arrangement and construction of the parts thereof may be resorted to without departing from the spirit and scope of the invention.

I claim:

1. An apparatus for cutting a strip of material into segments of a selected length including:
   means to feed the strip of material past a cutting position;
   means to cut the fed material at the cutting position once during each cycle;
   means to supply a signal once during each cycle;
   counting means to count each time that a signal is received from said signal supplying means;
   means to connect said signal supplying means to said counting means to supply the signal to said counting means from said signal supplying means at least during each cycle in which the thickness of the segment of the strip of material to be cut is within a predetermined thickness range;
   said counting means including two separate counters; and said connecting means including:
     first means to connect one of said counters to said signal supplying means only in each cycle in which the thickness of the segment of the strip of material to be cut is within the predetermined thickness range;
     and second means to connect the other of said counters to said signal supplying means through said first means when said second means is in a first position whereby said other counter counts only each cycle in which the thickness of the segment of the strip of material to be cut is within the predetermined thickness range and to connect said other counter directly to said signal supplying means when said second means is in a second position whereby said other counter counts each cycle of operation.

2. The apparatus according to claim 1 in which:
   said one counter includes means to inactivate said feed means and said cutting means after a selected number of cycles in which the thickness of the segment of the strip of material to be cut is within the predetermined thickness range.

3. The apparatus according to claim 2 in which said inactivating means includes means to inactivate said one counter after the selected number of cycles in which the thickness of the segment of the strip of material to be cut is within the predetermined thickness range.

4. The apparatus according to claim 1 including:
   means to produce a signal during the feed portion of the cycle when the segment of the strip of material to be cut during the cutting portion of the next cycle is not within the predetermined thickness range;
   and said first means of said connecting means includes means responsive to the signal from said signal producing means to disconnect said one counter from said signal supplying means at least when said signal supplying means supplies the signal.

5. The apparatus according to claim 1 in which:
   said feeding means feeds the strip of material in a vertical direction past the cutting position;
   and said cutting means cuts the fed material at the cutting position after stopping of feed of the strip of material by said feed means, said cutting means being disposed beneath said feed means.

6. An apparatus for cutting a strip of material into segments of a selected length including:
   means to feed the strip of material past a cutting position;
   means to cut the fed material at the cutting position once during each cycle;
   means to supply a signal once during each cycle;
   counting means to count each time that a signal is received from said signal supplying means;
   and means to connect said signal supplying means to said counting means to supply the signal to said counting means from said signal supplying means only during each cycle in which the thickness of the segment of the strip of material to be cut is within the predetermined thickness range whereby said counting means counts only each cycle in which the thickness of the segment of the strip of material to be cut is within the predetermined thickness range.

7. The apparatus according to claim 6 in which said counting means includes means to inactivate said feed means and said cutting means after a selected number of cycles in which the thickness of the segment of the strip of material to be cut is within the predetermined thickness range.

8. The apparatus according to claim 7 in which said inactivating means of said counting means includes means to inactivate said counting means after the selected number of cycles in which the thickness of the segment of the strip of material to be cut is within the predetermined thickness range.

9. The apparatus according to claim 6 in which said connecting means includes means to selectively connect said signal supplying means to said counting means to supply the signal to said counting means from said signal supplying means only during each cycle in which the thickness of the segment of the strip of material to be cut is within a predetermined thickness range whereby said counting means counts only each cycle in which the thickness of the segment of the strip of material to be cut is within the predetermined thickness range or during each cycle whereby said counting means counts each cycle of operation.

10. The apparatus according to claim 9 in which: said selectively connecting means includes:
first means responsive to whether the segment of the strip of material to be cut in each cycle is within the predetermined thickness range;
said first means being connected to said signal supplying means;
and second means connecting said counting means to said signal supplying means through said first means when said second means is in a first position and connecting said counting means directly to said signal supplying means when said second means is in a second position whereby said counting means counts only each cycle in which the thickness of the strip of material to be cut is within the predetermined thickness range when said second means is in its first position and said counting means counts each cycle of operation when said second means is in its second position.

11. The apparatus according to claim 10 in which:
said feeding means feeds the strip of material in a vertical direction past the cutting position;
and said cutting means cuts the fed material at the cutting position after stopping of feed of the strip of material by said feed means, said cutting means being disposed beneath said feed means.

12. The apparatus according to claim 6 in which:
said feeding means feeds the strip of material in a vertical direction past the cutting position;
and said cutting means cuts the fed material at the cutting position after stopping of feed of the strip of material by said feed means, said cutting means being disposed beneath said feed means.

13. The apparatus according to claim 10 in which:
said feeding means feeds the strip of material in a vertical direction past the cutting position;
and said cutting means cuts the fed material at the cutting position after stopping of feed of the strip of material by said feed means, said cutting means being disposed beneath said feed means.

* * * * *

UNITED STATES PATENT OFFICE
CERTIFICATE OF CORRECTION

Patent No. 3,872,751     Dated March 25, 1975

Inventor(s) Volker Schmidt

It is certified that error appears in the above-identified patent and that said Letters Patent are hereby corrected as shown below:

In The Abstract

Line 1, "means" should read -- counts --.

In The Specification

Col. 1, line 34, "satisfctory" should read -- satisfactory --.

Col. 7, line 30, "beteen" should read -- between --.

line 48, "beteen" should read -- between --.

In The Claims

Col. 11, lines 15 and 16, "said selectively connecting means includes:" should be a separate paragraph and indented appropriately.

Signed and sealed this 17th day of June 1975.

(SEAL)
Attest:

RUTH C. MASON
Attesting Officer

C. MARSHALL DANN
Commissioner of Patents
and Trademarks